(12) United States Patent
Ruggieri et al.

(10) Patent No.: US 10,308,743 B2
(45) Date of Patent: *Jun. 4, 2019

(54) WATER-SOLUBLE OR WATER-DISINTEGRABLE COPOLYMER

(71) Applicant: BellandTechnology AG, Pottenstein (DE)

(72) Inventors: Juan-Carlos Ruggieri, Joncy (FR); Herbert Leder, Sinzheim (DE); Frank Osan, Kelkheim im Taunus (DE)

(73) Assignee: BellandTechnology AG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,091

(22) Filed: Oct. 2, 2017

(65) Prior Publication Data

US 2018/0022847 A1 Jan. 25, 2018

Related U.S. Application Data

(62) Division of application No. 15/187,974, filed on Jun. 21, 2016, now Pat. No. 9,777,090, which is a division of application No. 13/881,536, filed as application No. PCT/EP2011/068879 on Oct. 27, 2011, now Pat. No. 9,399,691.

(30) Foreign Application Priority Data

Oct. 29, 2010 (EP) ...................................... 10189433

(51) Int. Cl.
| | |
|---|---|
| *C08F 220/18* | (2006.01) |
| *C08F 220/28* | (2006.01) |
| *C08F 2/04* | (2006.01) |
| *C08F 220/06* | (2006.01) |

(52) U.S. Cl.
CPC .......... *C08F 220/06* (2013.01); *C08F 220/18* (2013.01); *C08F 220/28* (2013.01)

(58) Field of Classification Search
None
See application file for complete search history.

(56) References Cited

U.S. PATENT DOCUMENTS

| | | | |
|---|---|---|---|
| 4,196,272 A | 4/1980 | Goretta et al. | |
| 4,711,725 A | 12/1987 | Amick et al. | |
| 6,013,421 A | 1/2000 | Nakamura et al. | |
| 6,096,847 A | 8/2000 | LoSasso | |
| 6,580,745 B1 | 6/2003 | Kondo | |
| 6,890,989 B2* | 5/2005 | Wang | C08L 51/00 525/166 |
| 9,399,691 B2* | 7/2016 | Ruggieri | C08F 220/06 |
| 2002/0115739 A1 | 8/2002 | Ohno et al. | |
| 2007/0252927 A1 | 11/2007 | Ichihashi et al. | |
| 2010/0096072 A1 | 4/2010 | Hopkins et al. | |

FOREIGN PATENT DOCUMENTS

| | | |
|---|---|---|
| CN | 1154375 | 6/2004 |
| DE | 196 39 347 A1 | 3/1998 |
| EP | 0 928 316 B1 | 3/2001 |
| GB | 833571 A | 4/1960 |
| JP | 61-31333 A | 2/1986 |
| JP | 63-139906 A | 6/1988 |
| JP | 02-28278 A | 1/1990 |
| JP | 2008-507619 A | 3/2008 |
| JP | 2008-101201 A | 5/2008 |
| JP | 2008-285385 A | 11/2008 |
| JP | 2009-191089 A | 8/2009 |
| JP | 2009-191209 | 8/2009 |
| WO | 2006/020279 A2 | 2/2006 |
| WO | 2009/132245 A1 | 10/2009 |
| WO | 2010/045147 A2 | 4/2010 |
| WO | 2010/143554 A1 | 12/2010 |

OTHER PUBLICATIONS

Jin Liu et al., "The Surface Activity of an Alkali Soluble Terpolymer," Chinese Journal of Applied Chemistry, vol. 21, No. 10, Oct. 2004, pp. 1038-10 41 (English abstract).
Jin Liu et al., "Synthesis of Alkali-Soluble Random Copolymer P(MMA/EA/MAA) for Use as Polymeric Surfactant in Emulsion Polymerization,"ACTA Polymerica Sinica, No. 1, Feb. 2005, pp. 149-152 (English abstract).
Olivier Colombani et al., "Synthesis of Poly(n-butyl acrylate)-block-poly(acrylic acid) D block Copolymers by ATRP and Their Micellization in Water," Macromolecules, vol. 40, 2007, pp. 4338-4350.
Benoît Lessard et al., "Styrene/Acrylic Acid Random Copolymers Synthesized by Nitroxide-Mediated Polymerization: Effect of Free Nitroxide on Kinetics and Copolymer Composition," Macromolecules, vol. 41, 2008, p. 3446-3454.
English translation of Chinese Third Office Action dated Dec. 8, 2015 from corresponding Chinese Patent Application No. 201180051582.0.
Notification of Reasons for Refusal dated Nov. 18, 2016 of corresponding Japanese Application No. 2015-246849 with two English translations.
Official Copy of Decision of Rejection including an Official Copy of Dismissal of Amendment in English mailed Apr. 7, 2017 of corresponding Japanese Application No. 2015-246849.
English translation of the Notice of Reason for Rejection dated Oct. 20, 2017, from corresponding Japanese Patent Application No. 2015-246849.

\* cited by examiner (Continued)

*Primary Examiner* — Vu A Nguyen
(74) *Attorney, Agent, or Firm* — DLA Piper LLP (US)

(57) ABSTRACT

A copolymer is based on α-β-unsaturated monocarboxylic acid, wherein the copolymer has a molar mass <100 000 g/mol. A process of preparing the copolymer compound includes mixing a copolymer in a melt with an impact modifier under action of shearing forces, a proportion of copolymer and impact modifier being selected preferably such that the copolymer forms a continuous phase and the impact modifier forms a discontinuous phase.

16 Claims, No Drawings

WATER-SOLUBLE OR WATER-DISINTEGRABLE COPOLYMER

TECHNICAL FIELD

This disclosure relates to a copolymer based on an α-β-unsaturated monocarboxylic acid, a copolymer compound comprising the copolymer, an impact modifier and processes for their preparation.

BACKGROUND

Water-soluble polymers are accorded particular importance as raw materials, semi-finished components or finished components in numerous technical fields.

Water-soluble polymers can be subdivided fundamentally into natural polymers such as proteins and polysaccharides, for example, semisynthetic polymers (engineered or modified natural polymers) such as cellulose derivatives and starch derivatives, for example, and entirely synthetic polymers. The latter are polymers synthesized starting from low molecular mass starting materials, referred to as monomers.

Water-soluble polymers prepared entirely synthetically are important in particular in the fields of medicine, pharmacy, cosmetics, paper processing, water treatment, petroleum extraction, adhesives and polyelectrolytes.

Thus, for example, acrylic polymers such as polyacrylic acid are used to produce hydrogels and superabsorbents. Polyacrylamide plays an important part in water purification and petroleum extraction. In addition, it is also employed as a flocculant. Polymethacrylic acid is used, for example, in cosmetics and as a tanning agent.

Vinyl polymers such as polyvinyl alcohol, for example, are used in particular to prepare of adhesives and emulsifiers. In addition, they are also important for the paper and textile industries.

The polymers polyvinylamine, polyvinyl methyl ether, polyvinylpyrrolidone and their copolymers are used, for example, for adhesives, eye drops, and blood plasma substitutes.

Polyvinyl methyl acetamide and polyvinyl sulphonic acid are used principally in hair cosmetics and also as catalyst materials.

Polyoxides, polyimines, polyethylene imines and polyethylene amines constitute preferred ion-exchange materials and are additionally used in paper processing. Polyoxyethylene is an ingredient of numerous cosmetics and toothpaste. Furthermore, polyoxyethylene is also used in the field of biomedicine.

Polyethylene oxazoline is used in medicine and the preparation of adhesives.

Polyamide sulphonates are used, for example, for drilling fluids and borehole cementation.

Some of the water-soluble, entirely synthetic polymers described above, however, have the disadvantage that their melt processability is limited or entirely non-existent, or else at least exists only at the risk of decomposition.

A copolymer or terpolymer that is soluble in aqueous alkali, and a polymer compound based thereon, are disclosed in EP 0 928 316 B 1.

It could therefore be helpful to provide a polymer that can be processed in the melt substantially without decomposition phenomena and that is, moreover, soluble particularly in an aqueous neutral environment, or at least can be disintegrated in an aqueous neutral environment.

SUMMARY

We provide a copolymer based on α-β-unsaturated monocarboxylic acid, wherein the copolymer has a molar mass <100 000 g/mol.

We also provide a process of preparing the copolymer wherein an α-β-unsaturated monocarboxylic acid and a comonomer including an ester of an α-β-unsaturated monocarboxylic acid, are copolymerized in solution.

We further provide a copolymer compound including a copolymer and an impact modifier.

We further yet provide a process of preparing a copolymer compound including mixing a copolymer in a melt with an impact modifier under action of shearing forces, a proportion of copolymer and impact modifier being selected preferably such that the copolymer forms a continuous phase and the impact modifier forms a discontinuous phase.

DETAILED DESCRIPTION

We provide a copolymer based on an α-β-unsaturated monocarboxylic acid, preferably acrylic acid, the copolymer having a molar mass (M)<(in words: of less than) 100 000 g/mol.

A copolymer means in principle a polymer composed of two or more different kinds of monomer types or monomer units.

The molar mass of the copolymer is preferably expressed as a weight average. The weight average, generally, alongside the number average, centrifuge average and viscosity average, is one of the most important identifying variables of a polymer or macromolecular compound. For its description, the weight fraction $w_i$ is defined as:

$$w_i = (N_i M_i)/[\Sigma(N_i M_i)].$$

The weight fraction $w_i$ indicates the proportion by weight of polymer molecules or macromolecules in a sample that consist of i repeating units (e.g. monomeric building blocks) possessing the molar mass $M_i$ and occurring $N_i$ times in the sample. For the weight average molar mass $M_w = \Sigma w_i M_i$, accordingly:

$$M_w = [\Sigma(N_i M_i^2)]/[\Sigma(N_i M_i)].$$

The weight average of a polymer sample is situated at the molar mass whose polymer molecules represent the largest, in terms of their mass, relative fraction in the sample.

The molar mass of the copolymer is determined preferably by gel permeation chromatography (GPC).

Surprisingly, we found that a copolymer based on an α-β-unsaturated monocarboxylic acid or prepared or synthesized primarily from monomers of an α-β-unsaturated monocarboxylic acid, preferably by solution polymerization, and possesses a molar mass <100 000 g/mol can be processed thermoplastically without problems and is soluble, or at least disintegrable, in a neutral aqueous environment in particular.

A water-soluble copolymer means a copolymer entirely, predominantly or only partly soluble in water.

A water-disintegrable copolymer means in particular a copolymer that can be swollen, suspended or dispersed in water or can be removed by water, that is, for example, flushed away, washed off or the like.

Preferably, the copolymer is an entirely, however, at least predominantly, water-soluble copolymer.

The copolymer may be soluble in water or disintegrable in water having a pH of 5 to 13, preferably of 6 to 8, more preferably of 6.5 to 7.5, with particular preference of around 7. In other words, it is particularly preferred if the copolymer is soluble or disintegrable in an aqueous-neutral pH environment. In addition or alternatively to this, however, the copolymer may also be soluble or at least disintegrable in an aqueous-acidic and/or an aqueous-alkaline or basic environment.

The copolymer is preferably soluble in water or disintegrable in water at room temperature. To assist or accelerate or complete the solubility in water, it may be of advantage to heat the copolymer in water.

Advantageously, the molar mass of the copolymer may be 25 000 g/mol to 90 000 g/mol, more particularly 30 000 g/mol to 85 000 g/mol, preferably 35 000 g/mol to 75 000 g/mol.

As already indicated above, the copolymer is based on an $\alpha$-$\beta$-unsaturated monocarboxylic acid. The expression "copolymer based on an $\alpha$-$\beta$-unsaturated monocarboxylic acid" means that the $\alpha$-$\beta$-unsaturated monocarboxylic acid constitutes the principal component of the copolymer and preferably has a weight fraction of >(greater than) 50% by weight, based on the total weight of the copolymer.

The $\alpha$-$\beta$-unsaturated monocarboxylic acid may have a weight fraction of 60% by weight to 95% by weight, more particularly 70% by weight to 90% by weight, preferably 75% by weight to 85% by weight, based on the total weight of the copolymer.

As already indicated, the copolymer is based preferably on acrylic acid (propenoic acid or, according to IUPAC (International Union of Pure and Applied Chemistry): Prop-2-enoic acid).

The copolymer preferably has a comonomer besides the $\alpha$-$\beta$-unsaturated monocarboxylic acid. A comonomer is a monomer that, alongside the $\alpha$-$\beta$-unsaturated monocarboxylic acid, participates in the construction of the copolymer or is used for the synthesis of the copolymer.

The comonomer is preferably an ester of an $\alpha$-$\beta$-unsaturated monocarboxylic acid. In this respect, we further surprisingly found that, through copolymerization of an $\alpha$-$\beta$-unsaturated monocarboxylic acid and an ester of an $\alpha$-$\beta$-unsaturated monocarboxylic acid, preferably in solution, a copolymer is obtained whose glass transition temperature ($T_g$) is lowered to an extent such that melting of the copolymer below its decomposition temperature is possible. As a result, the copolymer, with particular advantage, can be processed thermoplastically and can be further processed in particular by shaping techniques such as extrusion, injection molding or the like, for example.

With particular preference, the ester is an alkyl ester and/or alkoxyalkyl ester of an $\alpha$-$\beta$-unsaturated monocarboxylic acid.

The ester may have an alcohol radical, preferably a linear alcohol radical, more preferably a linear and aliphatic alcohol radical, having a carbon number of 2 to 8 carbon atoms, more particularly 2 to 6 carbon atoms, preferably 2 to 4 carbon atoms.

The ester of the $\alpha$-$\beta$-unsaturated monocarboxylic acid may be selected from alkyl acrylates, alkoxyalkyl acrylates, epoxyalkyl acrylates, alkyl methacrylates, alkoxyalkyl methacrylates, epoxyalkyl methacrylates and mixtures thereof.

The ester of the $\alpha$-$\beta$-unsaturated monocarboxylic acid may, for example, be selected from methyl acrylate, ethyl acrylate, n-butyl acrylate, isobutyl acrylate, methoxyethyl acrylate, ethoxyethyl acrylate, ethoxybutyl acrylate, glycidyl acrylate, methyl methacrylate, ethyl methacrylate, n-butyl methacrylate, isobutyl methacrylate, methoxyethyl methacrylate, ethoxyethyl methacrylate, ethoxybutyl methacrylate, glycidyl methacrylate and mixtures thereof.

Alkyl acrylates, particularly butyl acrylate, are a particularly preferred comonomer since the copolymer hereby becomes softer, which is an advantage for many end uses, especially for the end uses recited below.

The ester of the $\alpha$-$\beta$-unsaturated monocarboxylic acid may have a weight fraction of 5% by weight to 40% by weight, more particularly 10% by weight to 30% by weight, preferably 15% by weight to 25% by weight, based on the total weight of the copolymer.

Advantageously, the copolymer may be a copolymer of the $\alpha$-$\beta$-unsaturated monocarboxylic acid, which is preferably acrylic acid, and a further monomer, or a comonomer. In other words, it is of advantage if the copolymer is composed of or synthesized from only two different kinds of monomer units, of which one monomer unit constitutes the $\alpha$-$\beta$-unsaturated monocarboxylic acid, preferably acrylic acid.

Particular preference is given to a copolymer of the $\alpha$-$\beta$-unsaturated monocarboxylic acid, preferably acrylic acid, and an ester of an $\alpha$-$\beta$-unsaturated monocarboxylic acid. With regard to further features and details of the esters of the $\alpha$-$\beta$-unsaturated monocarboxylic acid, reference may be made in its entirety to the description hitherto.

The copolymer may be a solution copolymer or solution addition copolymer. A solution copolymer or solution addition copolymer means a copolymer prepared or synthesized by solution polymerization. The advantage of a solution polymerization is in particular that the resultant copolymer is distinguished by a narrow molar mass distribution and in particular by a low molar mass. As a result of the relatively low molar mass, the copolymer with particular advantage possesses better water-solubility or disintegrability in water, thereby considerably improving the processability, and especially possibilities for use, of the copolymer.

Advantageously, the copolymer may be amorphous, preferably entirely amorphous.

As already mentioned, the copolymer is with particular advantage a copolymer that can be processed in the melt. The copolymer is preferably thermoplastically processable, more particularly up to a temperature of 200° C., preferably up to a temperature of 220° C., more preferably up to a temperature of 240° C. As a result, in particular, the copolymer can also be processed in conventional plastics processing machinery in general without difficulties.

With particular advantage, the copolymer has a glass transition temperature ($T_g$) of 60° C. to 140° C., more particularly 80° C. to 120° C., preferably 100° C. to 120° C. Fundamentally, a glass transition temperature >100° C. is preferred.

To promote the thermoplastic processability of the copolymer, it is additionally preferred for the copolymer to possess a very high melt flow index since the thermal load generally impairs the flowability of the copolymer.

The melt flow index (MFI), measured in g/10 min, serves generally to characterize the flow behavior of a thermoplastic under defined pressure and temperature conditions. The melt flow index generally constitutes a measure of the viscosity of a polymer melt, allowing conclusions to be drawn in particular about the molar mass distribution expressed, for example, as the weight average of the polymer. The melt flow index is determined in general by a capillary rheometer: the polymer, typically in the form of pellets or powder, is melted in a heatable cylinder and pressed through a defined nozzle or capillary under a pressure developed by an applied load. In this method, the emerging volume or emerging mass of the polymer melt (called the extrudate) is determined as a function of time.

The copolymer preferably has a melt flow index of 5 g/10 min to 50 g/10 min, more particularly 10 g/10 min to 45 g/10 min, preferably 15 g/10 min to 30 g/10 min.

It is preferred, furthermore, for the copolymer to have a polydispersity of 2 to 5, more particularly 2 to 4, preferably 2 to 3. The polydispersity (molecular nonuniformity; breadth of the molecular weight distribution) is the ratio of the weight-average molar mass of the copolymer to the number-average molar mass of the copolymer. This polydispersity constitutes a measure of the viscoelastic properties or of the flowability of the copolymer.

The number-average molar mass ($M_n$) referred to in the preceding paragraph represents, as already mentioned, another important identifying parameter for a polymer or macromolecular compound, and can be defined by the following formula:

$$M_n = \Sigma N_i M_i / \Sigma N_i,$$

where $N_i$ is the number of polymer molecules or macromolecules in a sample with precisely i repeating units and with the molar mass $M_i$.

Further advantageously, the copolymer may be free from intramolecular anhydride structures or substantially free from intramolecular anhydride structures. In this context, it is particularly advantageous if the α-β-unsaturated monocarboxylic acid is acrylic acid since the carboxyl groups of acrylic acid tend towards intramolecular anhydride formation only at temperatures above those typical for the processing of polyacrylic acid, more particularly only at a temperature of around 270° C.

To flexibilize the copolymer or increase flexibility of the copolymer, it may additionally be preferred for the copolymer to be provided or compounded with an impact modifier.

The impact modifier generally does not influence the glass transition temperature of the copolymer, or at least not substantially.

The impact modifier typically produces a reduction in the MFI of the copolymer.

Depending on the nature of the impact modifier, it may increase the water solubility of the copolymer or disintegrability of the copolymer in water.

The copolymer is preferably provided or compounded with an impact modifier that is reactive towards carboxyl groups.

The impact modifier may have groups reactive towards carboxyl groups selected from epoxy groups, amino groups, primary amine groups, secondary amine groups, tertiary amine groups and combinations thereof. An impact modifier with epoxy and/or amino groups is preferred: one with epoxy groups is particularly preferred.

Particularly preferably, the impact modifier may have monomer units that carry epoxy groups such as glycidyl acrylate and/or glycidyl methacrylate monomer units, for example.

The impact modifier may additionally have a weight fraction of monomer units that carry epoxy groups of not more than 10% by weight, preferably not more than 6% by weight, more preferably not more than 4% by weight, based on the total weight of the impact modifier.

Advantageously, the impact modifier may be linked at least partly, in particular only partly, covalently to carboxyl groups of the copolymer, more particularly to carboxyl groups of the α-β-unsaturated monocarboxylic acid. The covalent linking is based preferably on the formation of ester groups and/or amide groups.

The impact modifier is generally a polymer, more particularly a copolymer or terpolymer. The impact modifier is preferably selected from styrene block copolymers, styrene block terpolymers, copolymers having a core-shell structure, terpolymers having a core-shell structure, copolymers containing epoxy groups, terpolymers containing epoxy groups, copolymers containing maleic anhydride groups, terpolymers containing maleic anhydride groups, ethylene copolymers, butadiene block terpolymers, thermoplastic polyesters, polybutadiene and copolymers or terpolymers thereof, nitrile-butadiene rubber, and mixtures, more particularly blends, thereof.

Suitable styrene block copolymers and styrene block terpolymers may be selected, for example, from styrene-butadiene copolymer, styrene-ethylene-butadiene terpolymer, styrene-butadiene-styrene block terpolymer, styrene-isoprene-butadiene terpolymer, and mixtures, more particularly blends, thereof.

Suitable copolymers and terpolymers having a core-shell structure may be selected, for example, from styrene-butylacrylate copolymer, styrene-butadiene-methyl methacrylate terpolymer, and mixtures, more particularly blends, thereof. Preference is given to copolymers and/or terpolymers having a core-shell structure with a core of polybutadiene and/or of a copolymer comprising butadiene and/or styrene.

Suitable copolymers containing maleic anhydride groups are selected, for example, from methyl acrylate-maleic anhydride copolymer, vinyl acetate-maleic anhydride copolymer, and mixtures, more particularly blends, thereof.

Further suitable impact modifiers are, for example, copolymers which comprise ethoxyethyl acrylate, ethoxybutyl acrylate, ethoxymethacrylate or mixtures thereof (as monomer units).

One particularly preferred impact modifier is a terpolymer comprising ethylene, butyl acrylate and glycidyl methacrylate monomer units.

Another preferred impact modifier is a terpolymer comprising ethylene, vinyl acetate and glycidyl methacrylate monomer units.

Advantageously, the impact modifier may have a weight fraction of 10% by weight to 40% by weight, more particularly 12% by weight to 30% by weight, preferably 15% by weight to 25% by weight, based on the total weight of the copolymer provided or compounded with the impact modifier.

In principle, the copolymer may be provided or compounded with further additives such as, for example, plasticizers, dispersants, lubricants, fillers, stabilizers, dyes or the like.

Suitable plasticizers are selected, for example, from the group encompassing dialkyl phthalates, cycloalkyl phthalates, benzyl and/or aryl phthalates, alkoxy phthalates, alkyl and/or aryl phosphates, carboxylic esters, polyglycol esters, adipic esters, citric esters, glycerol esters and mixtures thereof.

The copolymer may be provided or compounded with no additives other than an impact modifier, and in particular with no dispersant and/or lubricant.

We also provide a process of preparing the copolymer, wherein an α-β-unsaturated monocarboxylic acid, preferably acrylic acid, and a comonomer, preferably an ester of an α-β-unsaturated monocarboxylic acid, are copolymerized in solution. In other words, the copolymer is prepared by solution polymerization. As well as producing copolymers having a relatively low molar mass, solution polymerization has the general advantage that the heat of reaction formed can be easily removed and, in addition, that a continuous operating regime is possible. By solution polymerization, furthermore, it is possible with particular advantage to achieve conversions of 90% to 100%.

For the copolymerization, the α-β-unsaturated monocarboxylic acid and the comonomer are preferably dissolved in a solvent. The solvent is advantageously a low-boiling solvent, more particularly a solvent having a boiling point of below 100° C. (under normal or standard conditions). Solvent mixtures may likewise be used. Preferred solvents are alcohols such as, for example, ethanol, n-propanol, isopropanol, butanol or mixtures thereof.

To initiate copolymerization, the solution generally has a suitable polymerization initiator, more particularly a free-radical initiator such as dilauryl peroxide or dibenzoyl peroxide (DBPO), for example.

To limit the degree of polymerization of the resultant copolymer and/or attenuate the polymerization rate, it may also be of advantage for the solution to comprise a chain-transfer agent (regulator). Suitable chain-transfer agents may be selected, for example, from mercaptans such as 1-dodecanethiol, for example, halomethanes such as trichloromethane and/or tetrachloromethane, for example, aldehydes, acetals, α-methylstyrene dimer and mixtures thereof.

The copolymerization may be carried out at a temperature corresponding essentially to the boiling point of the solvent used, more particularly a temperature of 45° C. to 130° C., preferably 50° C. to 120° C., more preferably 60° C. to 100° C.

For further features and advantages, particularly in relation to the α-β-unsaturated monocarboxylic acid and/or to the comonomer, reference is made in full to the description hitherto.

We further provide a copolymer compound comprising the copolymer and also an impact modifier.

A copolymer compound means a mixture of the copolymer with at least one impact modifier. Therefore, it is readily possible for the compound to be provided or compounded not only with the impact modifier, but also with further additives, more particularly with additives of the type already described.

Preferably, the copolymer compound may be a two-phase compound. The reason for the two-phase nature of the compound is generally that the copolymer and the impact modifier in melt form are not compatible with one another, i.e. not miscible with one another.

Preferably, the copolymer is present in the form of a continuous phase, and the impact modifier in the form of a discontinuous, preferably finely disperse, phase. By generating a dispersion of the melted impact modifier in a continuous phase of the copolymer, with particular advantage, only limited contact areas are produced between the two melts. Maintaining a limited contact area of this kind between the two phases ensures that interactions, more particularly linking reactions, between the copolymer and the impact modifier are possible only in the boundary region.

The impact modifier preferably has a weight fraction of 10% by weight to 40% by weight, more particularly 12% by weight to 30% by weight, preferably 15% by weight to 25% by weight, based on the total weight of the compound.

The copolymer in the copolymer compound preferably has a glass transition temperature that is the same or substantially the same as the glass transition temperature of the uncompounded copolymer. The expression "substantially the same" means that a temperature deviation of −5° C. to +5° C. can in principle be possible.

The copolymer compound may have at least two, more particularly two, glass transition temperatures, with one glass transition temperature deriving from the copolymer and the other glass transition temperature deriving from the impact modifier.

Preferably, the copolymer compound has a lower melt flow index than the uncompounded copolymer. Accordingly, the copolymer compound may have a melt flow index of 1.5 g/10 min to 20 g/10 min, more particularly 2 g/10 min to 17 g/10 min, preferably 2 g/10 min to 12 g/10 min.

Advantageously, the copolymer compound may have a better solubility than the uncompounded copolymer in an aqueous, pH-neutral environment and/or an aqueous, alkaline environment.

We still further provide a process of preparing the copolymer compound, wherein a copolymer is mixed in the melt with an impact modifier under the action of shearing forces, the proportion of copolymer and impact modifier being selected preferably such that the copolymer forms the continuous phase and the impact modifier forms the discontinuous phase.

For this purpose, preferably, copolymer and impact modifier are premixed in the solid state, in the form of pellets, for example, and then jointly melted. This melting may take place already with mutual mixing. For the mixing it is possible, for example, to use twin-screw extruders, particularly those with co-rotating screws. The particle size of the impact modifier can be adjusted through the choice of mixing temperature, mixing time and shearing forces acting on the melt. The shearing forces are dependent in particular on the geometry of a mixer as, for example, on the screw geometry of an extruder, on the rotary speed of a mixer, and/or on the temperature and, hence, viscosity of the melt. Adding a dispersant such as a silicone oil, for example, may reinforce shearing and may lead to a reduction in the particle sizes of the impact modifier. Another important factor is the time, preferably kept as short as possible and is in general below 10 minutes. The impact modifier usually has a lower melting temperature than the copolymer and, therefore, begins to melt first on heating.

The mixing of copolymer and impact modifier takes place preferably at a temperature of 170° C. to 240° C., more particularly 180° C. to 230° C., preferably 190° C. to 210° C. After an initial coarse dispersion it is possible, as mentioned above, to add a dispersant to accelerate fine dispersion. Catalysts are preferably not added to limit the extent of the reaction between the copolymer and the impact modifier. To limit such a reaction it is possible, however, to add a lubricant, in particular towards the end of the mixing operation.

With regard to further features and advantages, particularly in relation to the copolymer and/or to the impact modifier, reference is made in full to the description hitherto.

The copolymer compound and/or the copolymer on which the compound is based may take the form in principle of powder, pellets, semi-finished component, finished component, thermoformed component, injection-molded component, extruded article, strand, profile or film, packaging film, for example. With particular preference, the copolymer is present in the form of a water-soluble support material or water-soluble support matrix, more particularly for use in the field of rapid prototyping, especially for application in three-dimensional printing processes (3D printing). Three-dimensional printing processes are, generally, the production of three-dimensional articles on the basis of polymers, the three-dimensionality of the articles being generated by CAD (Computer-Aided Design) data stored on computers.

Further features and details will become apparent from the description below of examples. In this context, individual features may each be actualized alone or in combinations of two or more with one another.

1. Example: copolymerization of acrylic acid and butyl acrylate

A three-necked flask with a capacity of 2 liters, equipped with a glass thermometer, a helical-coil condenser and a stirrer, was placed in a thermal bath. The flask was then charged with 200 g of ethanol, 40 g of butyl acrylate, 160 g of acrylic acid and 1.5 g of α-methylstyrene dimer. The thermal bath was set to a temperature of about 83° C., and the stirrer to a speed of 160 revolutions/minute (rpm). At a material temperature of approximately 77° C., 3 g of Perkadox LB 75 (initiator) were added. The temperature of the material rose in the subsequent 30 minutes to a maximum of 83° C., after which it fell back to a temperature of 77° C. After four hours, polymerization ended. The solvent was evaporated in a reduced-pressure oven at 100° C. The sample obtained was then dried in an oven at approximately 220° C. for half an hour. The properties possessed by the copolymer prepared in this way were as follows:

Fraction of free carboxyl groups: 40.8%, based on the total weight of the copolymer
M: 46 000 g/mol
Mn: 17 000 g/mol
$T_g$: 108° C.
Brabender torque at 220° C., 60 rpm after 15 min: 580 kpm (kilopond meters).
Melt index at 200° C./5 kg: 8.3 g/10 min.

2. Water-soluble acrylate polymers

TABLE 1

| Acrylate polymer | $T_g$ [° C.] | Behaviour on thermoplastic processing |
|---|---|---|
| PAAm | 170-188 | unstable |
| PAA | 131-150 | unstable |
| PMAA | 180-200 | unstable |

Key to Table 1:
PAAm: Polyacrylamide
PAA: Polyacrylic acid
PMAA: Polymethacrylic acid
$T_g$: Glass transition temperature Table 1 shows that known water-soluble acrylate polymers are disadvantageously unstable at their processing temperatures. In contrast, a particular advantage of our copolymers is that they can be processed thermoplastically without problems and, in addition, are water-soluble, or at least disintegrable in water (see also Tables 2 and 3.

3. Glass transition temperature and solubility of copolymers in water

TABLE 2

| Copolymer | Monomer composition | Weight fraction of the monomers | Solubility in neutral water at 20° C. | $T_g$ [° C.] |
|---|---|---|---|---|
| 1 | MEA-AA | 20:80 | S | 142 |
| 2 | BA-AA | 20:80 | S | 112 |
| 3 | MA-AA | 20:80 | SC | 117 |
| 4 | BMA-AA | 20:80 | SC | 128 |
| 5 | IBMA-AA | 20:80 | SC | 127 |
| 6 | EMA-AA | 20:80 | SC | 126 |
| 7 | MMA-AA | 20:80 | SC | 128 |
| 8 | PAA | 100 | SC | 131-150 |
| 9 | PMAA | 100 | I | 180-200 |

Key to Table 2:
S: Swellable in water or removable by washing with water
SC: Clear solution
I: Insoluble
MEA: Methoxyethyl acrylate
BA: Butyl acrylate
AA: Acrylic acid
MA: Methyl acrylate
BMA: Butyl methacrylate
IBMA: Isobutyl methacrylate
EMA: Ethyl methacrylate
MMA: Methyl methacrylate
PAA: Polyacrylic acid
PMAA: Polymethacrylic acid
$T_g$: Glass transition temperature The results in Table 2 first show that our copolymers (copolymers 1 to 7) are predominantly soluble in water, or at least swellable in water or removable by washing with water. Second, the results also show that our copolymers are notable for a glass transition temperature well below their decomposition temperatures, thereby improving their thermoplastic workability such as extrudability, for example, or indeed enabling this workability. On a majority basis, in particular, our copolymers are notable for a glass transition temperature lower than the glass transition temperature of conventional homoacrylic polymers (homopolymers 8 and 9), thereby decisively improving their thermoplastic processability as compared to these homoacrylic polymers.

4. Other water-soluble copolymers

TABLE 3

| Copolymer | Monomer composition | Weight fraction of the monomers | COOH % | $M_w$ (g/mol)/d ($M_w/M_n$) | MFI 200° C./ 10 kg | $T_g$ [° C.] | Solubility in H$_2$O at RT |
|---|---|---|---|---|---|---|---|
| 1 | MEA/AA | 20/80 | | 80 000/ 2.9 | 14 | 142 | R, C |
| | EMA/AA | 20/80 | 37 | 65 000/ 4.6 | 8 | 123 | C |
| 2 | MMA/AA | 20/80 | 36 | 35 000/ 2.5 | 6 | 123 | C |
| 3 | MA/AA | 20/80 | | 70 000/ 2.4 | | 105 | R |
| 4 | BA/AA | 20/80 | 40 | 61 000/ 3.4 | 14 | 106 | T |
| | BA/AA(b) | 20/80 | 43 | 56 000/ 2.8 | 15 | 110 | T |
| 5 | BA/AA | 40/60 | 32 | 44 000/ 2.6 | 42 | 82 | $T_p$ |

Key to Table 3:
S Soluble
R Rapidly soluble
C Solution clear
T Slightly turbid solution
$T_p$ Partially dissolved
$T_g$: Glass transition temperature
$M_w$: Molar mass
$N_n$: Number-average molar mass
d: Breadth of the molar mass distribution
RT: Room temperature
MFI: Melt flow index The percentage fraction of free carboxyl groups in Table 3 above relates to the total weight of the copolymer.

The breadth of the molecular weight distribution, d, indicated in Table 3 is the ratio of molar mass or molecular weight to number-average molar mass or number-average molecular weight.

The melt flow index MFI reported in Table 3 above was measured at a temperature of 200° C. under an applied load of 10 kg.

The data reproduced in Table 3 also demonstrate that our copolymers are fully water-soluble or at least disintegrable in water and at the same time have a glass transition temperature which allows melting below the stability limit.

5. Determination of the molar masses

The molar masses of our copolymers were determined by gel permeation chromatography (GPC), the elution volume of the copolymers in solution in THF being compared to the elution volume of a reference standard polymer in solution in THF. Chromatography columns used were GPC columns from Shodex, and a Kontron HPLC UV detector 430 was used (standard: PSS Ready Cal. Standards, high-molecular from Polymer Standards Service, Mainz, molecular sieve Union Carbide type 4A, evaluation PSS Win-GPC).

The invention claimed is:

1. A random copolymer based on α-β-unsaturated monocarboxylic acid, wherein the copolymer has a molar mass of 30,000 to <100 000 g/mol and a polydispersity of 2 to 3, and wherein the α-β-unsaturated monocarboxylic acid has a weight fraction of>50% by weight, based on the total weight of the copolymer, wherein the copolymer is in a form of a strand or profile, and the copolymer has in addition to the α-β-unsaturated monocarboxylic acid as comonomer an alkyl ester and/or alkoxy alkyl ester, of an α-β-unsaturated monocarboxylic acid.

2. The random copolymer according to claim 1, wherein the molar mass is 30,000 g/mol to 90,000 g/mol.

3. The random copolymer according to claim 1, wherein the α-β-unsaturated monocarboxylic acid has a weight fraction of 60% by weight to 95% by weight, based on the total weight of the copolymer.

4. The random copolymer according to claim 1, wherein the ester of the α-β-unsaturated monocarboxylic acid is selected from the group consisting of methyl acrylate, ethyl acrylate, n-butyl acrylate, isobutyl acrylate, methoxyethyl acrylate, glycidyl acrylate, methyl methacrylate, ethyl methacrylate, n-butyl methacrylate, isobutyl methacrylate, methoxyethyl methacrylate, glycidyl methacrylate and mixtures thereof.

5. The random copolymer according to claim 1, wherein the ester has a weight fraction of 5% by weight to 40% by weight, based on the total weight of the copolymer.

6. The random copolymer according to claim 1, wherein the copolymer is a copolymer of the α-β-unsaturated monocarboxylic acid and an ester of an α-β-unsaturated monocarboxylic acid.

7. A random copolymer based on α-β-unsaturated monocarboxylic acid, wherein the copolymer has a molar mass of 30,000 to <100 000 g/mol and a polydispersity of 2 to 3, the α-β-unsaturated monocarboxylic acid has a weight fraction of>50% by weight, based on the total weight of the copolymer, the copolymer is in a form of a strand or profile, and the copolymer is a solution copolymer.

8. The random copolymer according to claim 1, wherein the copolymer has a glass transition temperature of 60° C. to 140° C.

9. The random copolymer according to claim 1, wherein the copolymer has a melt flow index of 5 g/10 min to 50 g/10 min.

10. The random copolymer according to claim 1, wherein the copolymer is disintegrable or soluble or substantially soluble in an aqueous, pH-neutral environment and/or in an aqueous, alkaline environment.

11. The copolymer according to claim 1, wherein the copolymer is provided or compounded with an impact modifier reactive toward carboxyl groups.

12. The copolymer according to claim 11, wherein the impact modifier has a weight fraction of 10% by weight to 40% by weight, based on the total weight of the copolymer provided or compounded with the impact modifier.

13. A process of preparing the copolymer according to claim 1, wherein an α-β-unsaturated monocarboxylic acid and a comonomer comprising an ester of an α-β-unsaturated monocarboxylic acid, are copolymerized in solution.

14. A copolymer compound comprising a copolymer according to claim 1, and an impact modifier.

15. A process of preparing a copolymer compound according to claim 14, comprising mixing a copolymer in a melt with an impact modifier under action of shearing forces, a proportion of copolymer and impact modifier being selected preferably such that the copolymer forms a continuous phase and the impact modifier forms a discontinuous phase.

16. A random copolymer based on α-β-unsaturated monocarboxylic acid, wherein the copolymer has a molar mass of 30,000 to <100 000 g/mol and a polydispersity of 2 to 3, the α-β-unsaturated monocarboxylic acid has a weight fraction of>50% by weight, based on the total weight of the copolymer, the copolymer is in a form of a strand or profile, and the copolymer has in addition to the α-β-unsaturated monocarboxylic acid as comonomer an ester of an α-β-unsaturated monocarboxylic acid.

* * * * *